US009823945B2

(12) United States Patent
Wang

(10) Patent No.: US 9,823,945 B2
(45) Date of Patent: Nov. 21, 2017

(54) METHOD AND APPARATUS FOR MANAGING APPLICATION PROGRAM

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Peng Wang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 849 days.

(21) Appl. No.: 14/140,631

(22) Filed: Dec. 26, 2013

(65) Prior Publication Data

US 2014/0189697 A1 Jul. 3, 2014

(30) Foreign Application Priority Data

Dec. 27, 2012 (CN) .......................... 2012 1 0577722

(51) Int. Cl.
*G06F 9/48* (2006.01)
*G06F 9/50* (2006.01)

(52) U.S. Cl.
CPC ............ *G06F 9/485* (2013.01); *G06F 9/5022* (2013.01)

(58) Field of Classification Search
None
See application file for complete search history.

(56) References Cited

U.S. PATENT DOCUMENTS

| 6,496,864 | B1 * | 12/2002 | McCartney | ........... G06F 9/4843 709/205 |
| 7,886,302 | B2 * | 2/2011 | Kadashevich | ...... G06F 11/3419 709/223 |
| 2009/0293062 | A1 * | 11/2009 | Amir | ....................... G06F 9/485 718/104 |
| 2013/0097605 | A1 * | 4/2013 | Martinka | ................ G06F 9/485 718/100 |
| 2014/0075139 | A1 * | 3/2014 | Reed | ....................... G06F 12/02 711/162 |

FOREIGN PATENT DOCUMENTS

TW 201220180 5/2012

* cited by examiner

*Primary Examiner* — Lewis A Bullock, Jr.
*Assistant Examiner* — Bruce S Ashley
(74) *Attorney, Agent, or Firm* — ScienBiziP, P.C.

(57) ABSTRACT

A method for managing application programs is provided. The method includes acquiring whether a daemonic application program is running in an operating system, collecting a memory occupancy of the daemonic application program periodically within a time period upon finding a daemonic application program; determining whether the daemonic application program is in a long-term standby status according to the memory occupancy of the daemonic application program, and closing the daemonic application program when the daemonic application program is in a long-term standby status. An application program management system is also provided.

14 Claims, 5 Drawing Sheets

METHOD AND APPARATUS FOR MANAGING APPLICATION PROGRAM

CROSS-REFERENCE TO RELATED APPLICATIONS

This application claims all benefits accruing under 35 U.S.C. §119 from China Patent Application No. 201210577722.4, filed on Dec. 27, 2012, in the China Intellectual Property Office, the content of which is hereby incorporated by reference.

BACKGROUND

1. Technical Field

The present disclosure relates to software management, and more particularly, to a method for managing application programs and an application program management system.

2. Description of Related Art

The operating system (OS) in most electronic devices such as smart phones and tablet computers supports various application programs which are downloaded and installed by a user. In operation, many application programs may run simultaneously in the operating system, when a new application program is opened or activated by the user, the currently-used application is turned to a daemonic application which is still running in the operation system and occupying system resource. However, some of the daemonic applications may be undesired by the user and thus would not be activated for a long time. These daemonic applications occupy too much system resource and affect normal operation of other application software. To close the daemonic applications, the user needs to access the daemonic applications and manually close the daemonic applications. This is inconvenient for the user.

What is needed is to provide a means that can overcome the above-described limitations.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various embodiments in detail.

Figure 1:
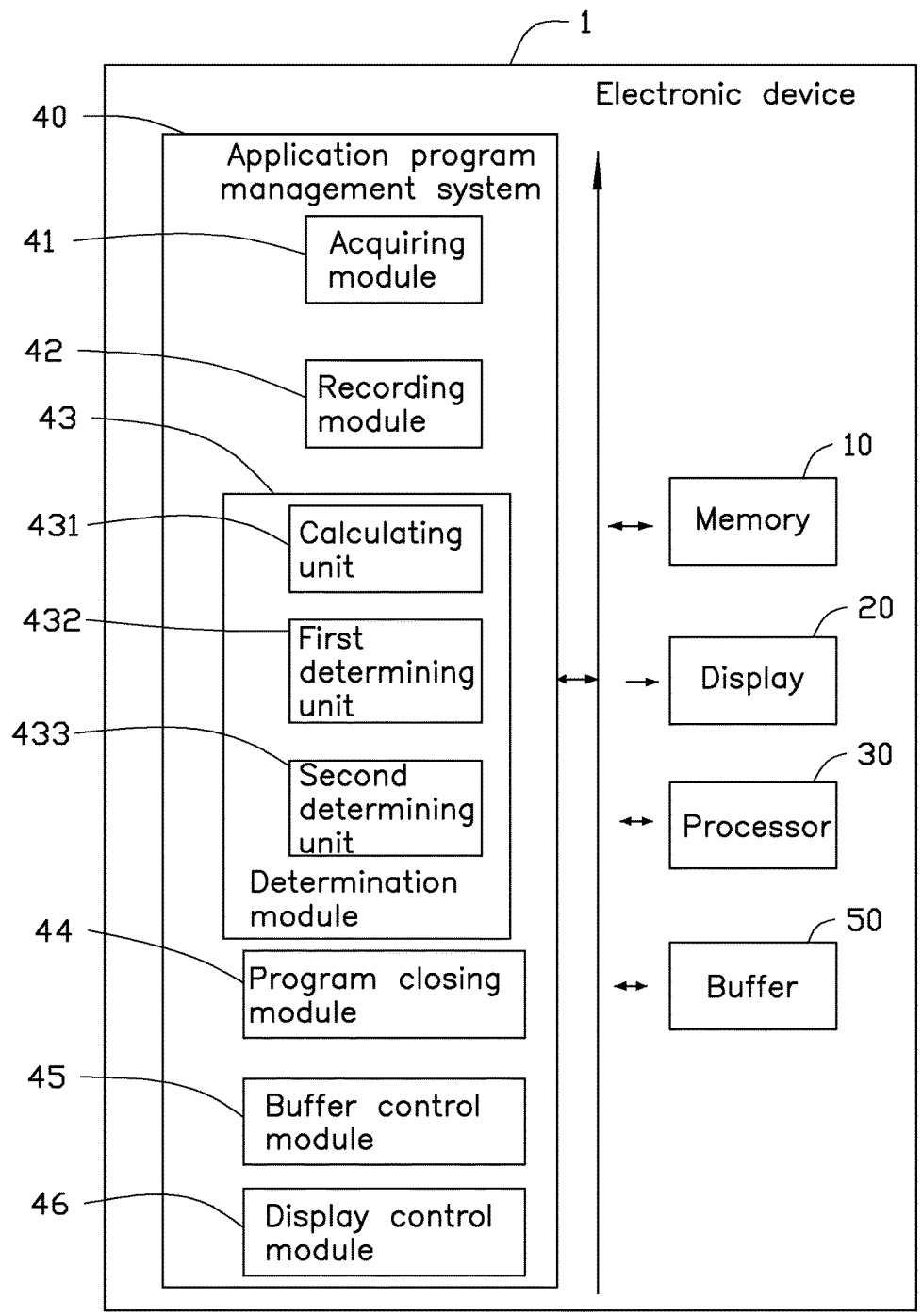
FIG. 1 is a schematic block diagram of an application program management system used in an electronic device according to an embodiment of the present disclosure.

An application program management system according to an embodiment of the present disclosure is illustrated in FIG. 1, the application program management system is applicable to an electronic device 1 such as a smart phone, a tablet computer, an electronic book, a portable multimedia player, a portable game player, a mobile internet device (MID), a personal digital assistant (PDA), or the like. The electronic device 1 includes a memory 10, a display 20, a processor 30, an application program management system 40, and a buffer 50. Furthermore, a plurality of application programs may be stored in the memory 10 and executed by the processor 30 within an operating system.

The application program management system 40 includes an acquiring module 41, a recording module 42, a determination module 43 and a program closing module 44. The determination module 43 may include a calculating unit 431, a first determining unit 432 and/or a second determining unit 433. Optionally, the applicant program management system 40 may also include a buffer control module 45 and a display control module 46. The acquiring module 41, the recording module 42, the determination module 43, the program closing module 44, the buffer control module 45, and the display control module 46 may be firmware installed in the memory 10, and can be executed by the processor 30 within the operating system.

Figure 2:
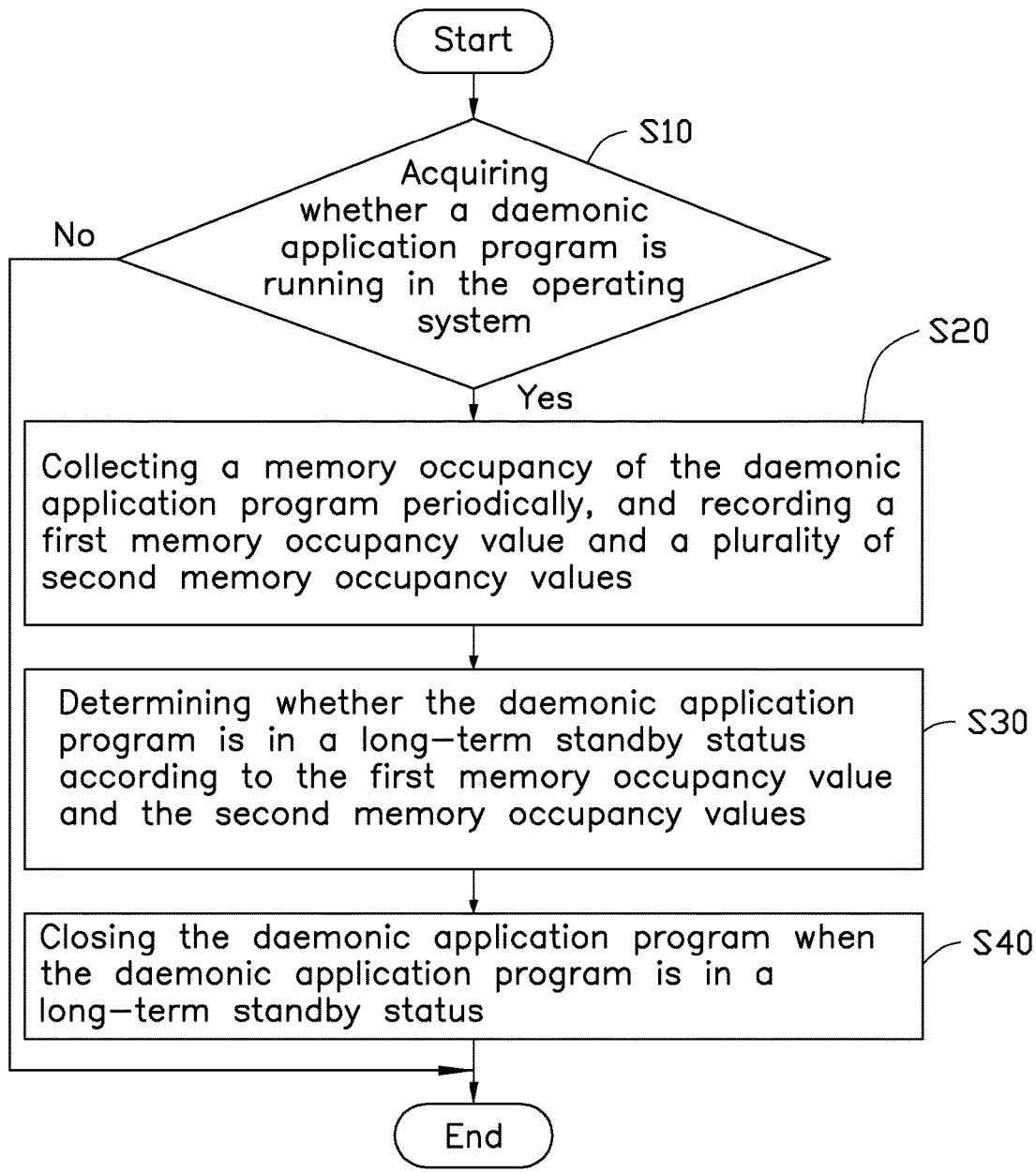
FIG. 2 is a flow chart of a method for managing application programs according to an embodiment of the present disclosure.

The functionality of the above-mentioned modules 41~46 in the application program management system 40 will be described in accompany with methods for managing application programs as illustrated in FIG. 2.

FIG. 2 illustrates a method for managing application programs according to an embodiment of the present disclosure; the method includes the following steps.

Step S10, the application program management system 40 acquires whether a daemonic application program is running in the operating system;

When the application program management system 40 starts to implement the method, the acquiring module 41 is utilized to acquire whether a daemonic application program is running in the operating system. If the acquiring module 41 finds that a daemonic application program is running, the method turns to step S20, otherwise, the method is ended.

Step S20, a memory occupancy of the daemonic application program is collected periodically, and accordingly a first memory occupancy value and a plurality of second memory occupancy values are recorded.

When a daemonic application program is found, the application program management system 40 may start a collection process. Specifically, the application program management system 40 utilizes the recording module 42 to collect a memory occupancy of the daemonic application program periodically in a time period T, the memory occupancy of the daemonic application program may be collected from a task manager in the operating system.

Assuming the time period T starts at a time instance T1, the recording module 42 collects a memory occupancy of the daemonic application program at the time instance T1 and thus a first memory occupancy value is recorded; the recording module 42 collects memory occupancy of the daemonic application program after every collection period P in the time period T, so that a plurality of second memory occupancy values are recorded. For example, after the first memory occupancy value is recorded, the recording module 42 may re-collect the memory occupancy of the daemonic application program at time instances T1+P, T1+2P, . . . , T1+NP (where N is an integer and N=T/P), and thus N second memory occupancy values are obtained. In one embodiment, the time period T may be 30 minutes, and the collection period P may be 10 minutes; consequently, the number of second memory occupancy values is three.

Step S30, the application program management system 40 determines whether the daemonic application program is in a long-term standby status according to the first memory occupancy value and the second memory occupancy values.

For example, the application program management system 40 utilizes the determination module 43 to perform a predefined memory variation algorithm on the first memory occupancy value and the second memory occupancy values to obtain multiple memory variation values, and then determine whether the daemonic application program is in a long-term standby status based on the memory variation values. The long-term standby status may refer to a status that the daemonic application program is running but no data transmission or reception is implemented for a long time. Details of step S30 will be described in the followings in accompany with FIG. 3 and FIG. 4.

Step S40, the daemonic application program is closed when the daemonic application program is in a long-term standby status.

In this step, when the determination module 43 determines that the daemonic application program is in the long-term standby status, it is indicated that the daemonic application program occupies system resource continuously but not be activated for a long time, therefore, the application program management system 40 utilizes the program closing module 44 to close the daemonic application program, so that the system resource unnecessarily occupied by the daemonic application program is released to ensure other application program to run normally.

Figure 3:
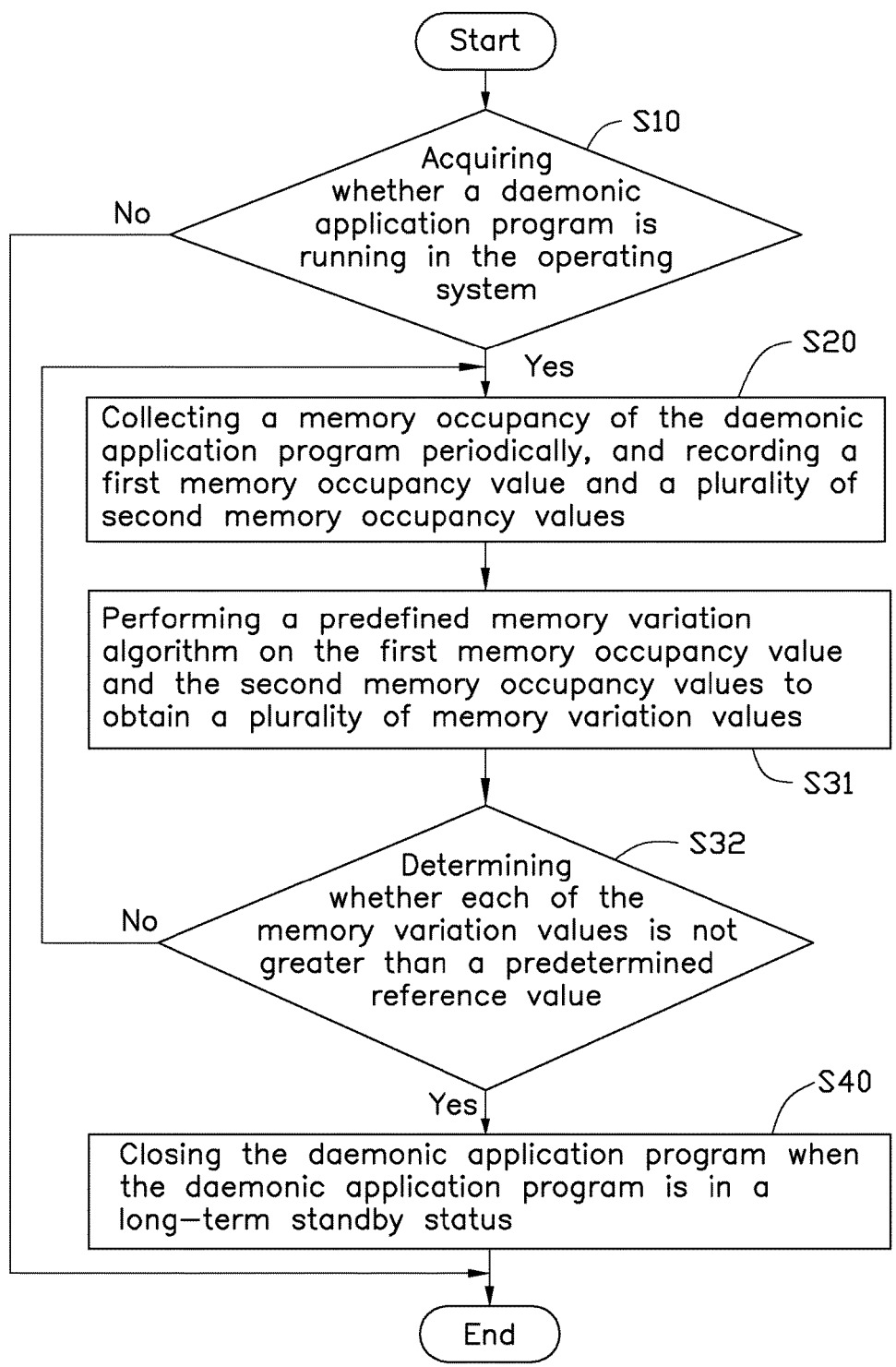
FIG. 3 illustrates an optional implementation of determining whether the daemonic application program is in a long-term standby status in the method of FIG. 2.
Figure 4:
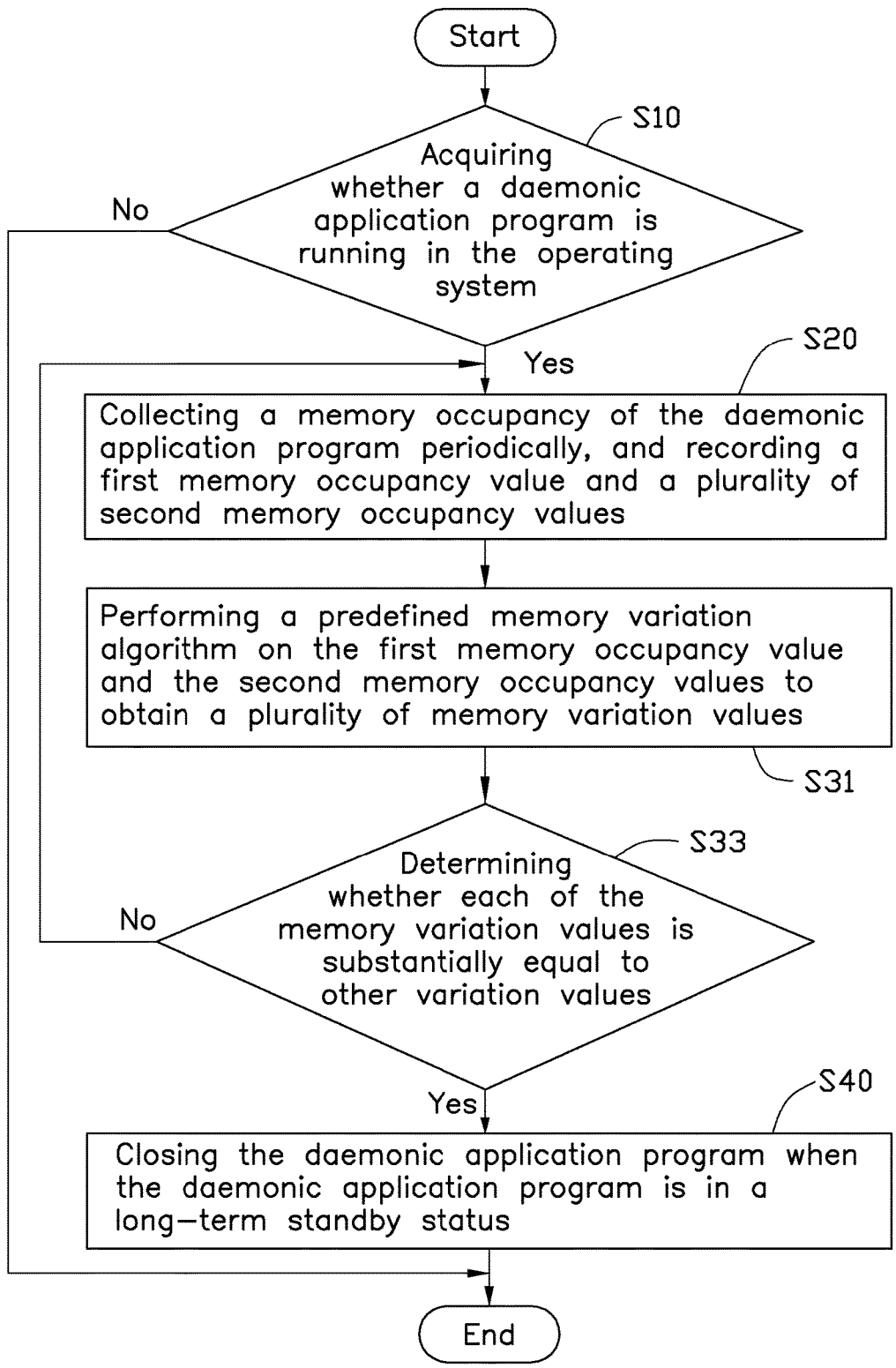
FIG. 4 illustrates another optional implementation of determining whether the daemonic application program is in a long-term standby status in the method of FIG. 2.

FIG. 3 and FIG. 4 respectively illustrate two optional implementations of determining whether the daemonic application program is in a long-term standby status in step S30. In a first optional implementation, step S30 includes the following sub-steps S31 and S32, as shown in FIG. 3; and the determination module 43 includes a calculating unit 431 and a first determining unit 432.

Sub-step S31, a predefined memory variation algorithm is performed on the first memory occupancy value and the second memory occupancy values to obtain a plurality of memory variation values.

The calculating unit 431 in the determination module 43 is utilized to perform the memory variation algorithm. In detail, the calculating unit 431 may subtract the first memory occupancy value from each of the second memory occupancy values, and thus a plurality of subtracting results, which respectively indicate memory variations of the time instances T1+P, T1+2P, . . . , T1+NP in relative to the time instance T1 in the memory occupancy collection time period T, are obtained and treated as the memory variation values.

For example, a difference between a second memory occupancy value collected at the time instance T1+P and the first memory occupancy value collected at the time instance T1 is a memory variation within the first collection period; a difference between a second memory occupancy value collected at the time instance T1+2P and the first memory occupancy value collected at the time instance T1 is a memory variation within the first and second collection periods; . . . ; and analogously, a difference between a second memory occupancy value collected at the time instance T1+NP and the first memory occupancy value collected at the time instance T1 is a memory variation within the time period T.

Sub-step S32, the determination module 43 determines whether each of the memory variation values is not greater than a predetermined reference value.

The first determining unit 432 of the determination module 43 is utilized to compare each of the memory variation values with a predetermined reference value, and determine whether each of the memory variation values is not greater than the reference value. The reference value may refer to a minimum memory variation value when data transmission or reception occurs. Thus, if each of the memory variation values is not greater than the reference value, it is indicated that no data transmission or reception is performed by the daemonic application program within the time period T, and accordingly the first determining unit 432 may conclude that the daemonic application program is in a long-term standby status; in contrast, if one or more memory variation value is greater than the reference value, it is indicated that the daemonic application program performs data transmission or reception within the time period T, and accordingly the first determining unit 432 may conclude that the daemonic application program has been activated within the time period T.

Furthermore, if it is determined that each of the memory variation values is not greater than a predetermined reference value, the method turns to step S40; otherwise, the method returns to step S20.

In a second optional implementation, step S30 includes the following sub-steps S31 and S33, as shown in FIG. 4; and the determination module 43 includes a calculating unit 431 and a second determining unit 433.

Sub-step S31, a predefined memory variation algorithm is performed on the first memory occupancy value and the second memory occupancy values to obtain a plurality of memory variation values.

Sub-step S33, the determination module 43 determines whether each of the memory variation values is substantially equal to other variation values.

The second determining unit 433 of the determination module 43 is utilized to determine whether each of the memory variation values is substantially equal to others, if each of the memory variation values is substantially equal to others, the second determining unit 433 may conclude that the daemonic application program is in a long-term standby status, and consequently the method turns to step S40; if the second determining unit 433 finds one or more memory variation value is different from any other memory variation value, the second determining unit 433 may conclude that the daemonic application program has been activated within the time period T, and consequently the method returns to step S20.

Furthermore, in yet another optional implementation, step S30 may include sub-steps S31, S32 and S33, and correspondingly the determination module 43 includes the calculating unit 431, the first determining unit 432 and the second determining unit 433. In this implementation, after the memory variation values are obtained in sub-step S31, sub-step S32 is implemented to determine whether each of the memory variation values is not greater than a predetermined reference value, if so, the method continues to implement sub-step S33 to determine whether each of the memory variation values is substantially equal to other variation values. Only if the each of the memory variation values is not greater than the predetermined reference value and is substantially equal to other variation values, the determination module 43 determines that the daemonic application program is in a long-term standby status, and thus the method turns to step S40.

Figure 5:
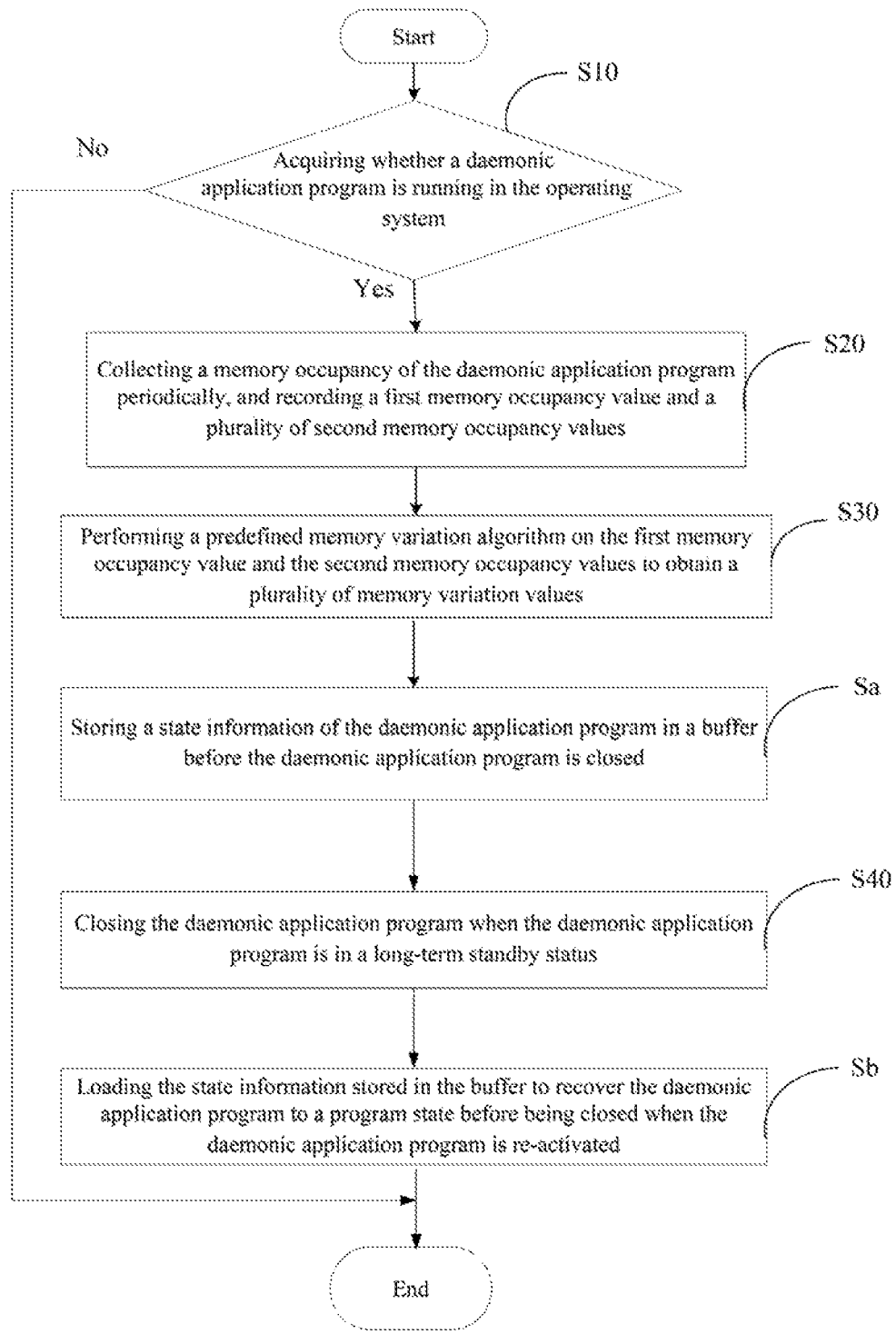
FIG. 5 is a flow chart of a method for managing application programs according to another embodiment of the present disclosure.

FIG. 5 is a flow chart of a method for managing application programs according to another embodiment of the present disclosure. The method differs from the above-described method as illustrated in FIG. 4 in that, the method in this embodiment further includes step Sa and step Sb that are respectively implemented before and after step S40.

Step Sa, a state information of the daemonic application program is stored in a buffer 50 before the daemonic application program is closed.

In this step, the application program management system 40 utilizes the buffer control module 45 to control the buffer 50 to store a current state information of the daemonic application program before the daemonic application program is closed. For example, the buffer control module 45 may extract the state information of the daemonic application program, and transmit the state information of the daemonic application program to the buffer 50 for storing. After the buffer 50 stores the state information of the daemonic application program, the method may turn to step S40 to close the daemonic application program.

Step Sb, the state information stored in the buffer 50 is loaded to recover the daemonic application program to a program state before being closed when the daemonic application program is re-activated.

When the daemonic application program is re-activated, the application program management system 40 utilizes the display control module 46 to load the state information stored in the buffer 50, and thus the daemonic application program is automatically recovered to the program state before being closed and is displayed in the display 20. As such, an operation efficiency of the daemonic application program can be improved.

In the method for managing application programs as provided in the present disclosure, the daemonic application program can automatically close if being in a long-term standby status, and thus the system resource occupied by the daemonic application program can be released to ensure other application program to run normally. Moreover, it is unneeded for the user to manually close the daemonic application program; this can improve a user experience of the operating system.

It is to be understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed.

What is claimed is:

1. A method for managing application programs, comprising:
    acquiring whether a daemonic application program is running in an operating system; collecting a memory occupancy of the daemonic application program periodically within a time period upon finding a daemonic application program;
    collecting a memory occupancy of the daemonic application program periodically within a time period upon finding a daemonic application program, wherein the step of collecting a memory occupancy of the daemonic application program periodically within a time period comprises:
        collecting a memory occupancy of the daemonic application program at a first time instance when the time period starts to obtain and record a first memory occupancy value,
        collecting memory occupancy of the daemonic application program after every collection period within the time period to obtain and record a plurality of second memory occupancy values, wherein the length of the time period is a multiple of an integral of the length of the collection period;
    determining whether the daemonic application program is in a long-term standby status according to the memory occupancy of the daemonic application program, wherein the step of determining whether the daemonic application program is in a long-term standby status comprises:
        performing a memory variation algorithm on the first memory occupancy value and the second memory occupancy values to obtain a plurality of memory variation values, wherein the step of performing a memory variation algorithm on the first memory occupancy value and the second memory occupancy values comprises:
            subtracting the first memory occupancy value from each of the second memory occupancy values to obtain a plurality of subtracting results, wherein the subtracting results are treated as the memory variation values; and
        determining whether the daemonic application program is in a long-term standby status based on the memory variation values;
    closing the daemonic application program when the daemonic application program is in a long-term standby status.

2. The method of claim 1, wherein the memory occupancy of the daemonic application program is collected from a task manager in the operating system.

3. The method of claim 1, wherein the determining whether the daemonic application program is in a long-term standby status comprising:
    comparing each of the memory variation values with a reference value, and determining whether each of the memory variation values is not greater than the reference value;
    upon finding that each of the memory variation values is not greater than the reference value, determining that the daemonic application program is in a long-term standby status; and
    upon finding that at least one of the memory variation values is greater than the reference value, determining that the daemonic application program has been activated within the time period.

4. The method of claim 1, wherein the determining whether the daemonic application program is in a long-term standby status comprising:
    determining whether each of the plurality of memory variation values is equal to other memory variation values of the plurality of memory variation values;
    upon finding that each of the plurality of memory variation values is equal to other memory variation values of the plurality of memory variation values, determining that the daemonic application program is in a long-term standby status;
    upon finding that at least one of the plurality of memory variation values is not equal to any of other memory variation values of the plurality of memory variation values, determining that the daemonic application program has been activated within the time period.

5. The method of claim 1, wherein the determining whether the daemonic application program is in a long-term standby status comprising:
    comparing each of the plurality of memory variation values with a reference value, and determining whether each of the plurality of memory variation values is not greater than the reference value;

upon finding that each of the plurality of memory variation values is not greater than the reference value, determining whether each of the plurality of memory variation values is equal to other memory variation values of the plurality of memory variation values;

upon finding that each of the plurality of memory variation values is equal to other memory variation values of the plurality of memory variation values, determining that the daemonic application program is in a long-term standby status.

6. The method of claim 1, further comprising:
storing a state information of the daemonic application program in a buffer before the daemonic application program is closed.

7. The method of claim 6, further comprising:
when the daemonic application program is re-activated, loading the state information stored in the buffer to recover the daemonic application program to a program state before being closed.

8. An application program management system applicable to an electronic device, the application program management system being installed in a memory and executed by a processor, the application program management system comprising:
an acquiring module for acquiring whether a daemonic application program is running in an operating system;
a collecting module for collecting a memory occupancy of the daemonic application program periodically within a time period comprises:
collecting a memory occupancy of the daemonic application program at a first time instance when the time period starts to obtain and record a first memory occupancy value;
collecting memory occupancy of the daemonic application program after every collection period within the time period to obtain and record a plurality of second memory occupancy values, wherein the length of the time period is a multiple of an integral of the length of the collection period;
a determination module for determining whether the daemonic application program is in a long-term standby status based on the memory occupancy of the daemonic application program, wherein the step of determining whether the daemonic application program is in a long-term standby status comprises:
performing a memory variation algorithm on the first memory occupancy value and the second memory occupancy values to obtain a plurality of memory variation values, wherein the step of performing a memory variation algorithm on the first memory occupancy value and the second memory occupancy values comprises:
subtracting the first memory occupancy value from each of the second memory occupancy values to obtain a plurality of subtracting results, wherein the subtracting results are treated as the memory variation values; and determining whether the daemonic application program is in a long-term standby status based on the memory variation values;
closing the daemonic application program when the daemonic application program is in a long-term standby status.

9. The application program management system of claim 8, wherein the collecting module collects the memory occupancy of the daemonic application program from a task manager in the operating system.

10. The application program management system of claim 8, wherein the determination module further comprises:
a first determining unit for comparing each of the memory variation values with a reference value to determine whether each of the memory variation values is not greater than the reference value, and determining that the daemonic application program is in a long-term standby status upon finding that each of the memory variation values is not greater than the reference value.

11. The application program management system of claim 8, wherein the determination module further comprises:
a second determining unit for determining whether each of the plurality of memory variation values is equal to other memory variation values of the plurality of memory variation values, and determining that the daemonic application program is in a long-term standby status upon finding that each of the memory variation values is equal to other memory variation values of the plurality of memory variation values.

12. The application program management system of claim 8, wherein the determination module further comprises:
a first determining unit for comparing each of the plurality of memory variation values with a reference value to determine whether each of the plurality of memory variation values is not greater than the reference value; and
a second determining unit for determining whether each of the plurality of memory variation values is equal to other memory variation values of the plurality of memory variation values when the first determining unit finds that each of the plurality of memory variation values is not greater than the reference value, and determining that the daemonic application program is in a long-term standby status upon finding that each of the memory variation values is equal to other memory variation values of the plurality of memory variation values.

13. The application program management system of claim 8, further comprising:
a buffer control module for controlling a buffer to store a state information of the daemonic application program before the daemonic application program is closed.

14. The application program management system of claim 13, further comprising:
a display control unit for loading the state information stored in the buffer to recover the daemonic application program to a program state before being closed and controlling a display to display the daemonic application program when the daemonic application program is re-activated.

* * * * *